(12) United States Patent
Helmrich et al.

(10) Patent No.: US 9,737,948 B2
(45) Date of Patent: Aug. 22, 2017

(54) METHOD FOR WELDING THIN-WALLED TUBES BY MEANS OF PEAK TEMPERATURE TEMPER WELDING

(75) Inventors: Andreas Helmrich, Remshalden (DE); Andreas Kopp, Schönaich (DE); Keyfo Yildirim, Stuttgart (DE); Torsten Baumgarten, Erfurt-Frienstedt (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 214 days.

(21) Appl. No.: 13/558,477

(22) Filed: Jul. 26, 2012

(65) Prior Publication Data
US 2013/0248493 A1 Sep. 26, 2013

(30) Foreign Application Priority Data

Jul. 26, 2011 (DE) .................... 10 2011 052 161
Nov. 11, 2011 (DE) .................... 10 2011 055 282
Mar. 9, 2012 (EP) ......................... 12158733

(51) Int. Cl.
*B23K 31/02* (2006.01)
*B23K 9/00* (2006.01)
(Continued)

(52) U.S. Cl.
CPC .......... *B23K 9/0035* (2013.01); *B23K 9/0052* (2013.01); *B23K 9/0286* (2013.01);
(Continued)

(58) Field of Classification Search
CPC .. B23K 9/0035; B23K 31/125; B23K 9/0052; B23K 9/0286; B23K 9/167; B23K 9/23;
(Continued)

(56) References Cited

U.S. PATENT DOCUMENTS 2,812,419 A * 11/1957 Chyle ................. B23K 35/286
219/137 R
2,819,517 A * 1/1958 Pursell ......................... 228/168
(Continued)

FOREIGN PATENT DOCUMENTS

DE 102011054718 A1 5/2012
JP 6-17069 A 1/1986
(Continued)

OTHER PUBLICATIONS

Heuser: Schweisstechnische Verarbeitung neuer Kraftwerkstahle, Oct. 20, 2009, Seiten 1-50, XP55043708, Gefunden im Internet: URL:http://bayern-innovativ.de/schweisstechnik2009/download/heuser.pdf.
(Continued)

*Primary Examiner* — Hung D Nguyen
(74) *Attorney, Agent, or Firm* — GE Global Patent Operation; Stephen G. Midgley (57) ABSTRACT

A method is disclosed for connecting two components by TIG welding, the components consisting of an air-hardening steel alloy and, for example, of the material T23 or T24. A joint is produced between the components that are to be connected, said joint widening, in particular, from an inside toward an outside. First, a root layer is welded in the region of the inside. Subsequently, a fill layer adjoining the root layer is welded, so that the joint is at least 90% filled. Finally, a cover layer is welded onto the fill layer, whereby the welding parameters are prespecified in such a manner that a temperature in an optimizing temperature range is adjusted on the inside in the region of the root layer.

16 Claims, 5 Drawing Sheets

(51) Int. Cl.

| | | |
|---|---|---|
| *B23K 9/028* | (2006.01) | |
| *B23K 9/167* | (2006.01) | |
| *B23K 9/23* | (2006.01) | |
| *B23K 31/12* | (2006.01) | |
| *C21D 9/50* | (2006.01) | |
| *F22B 37/10* | (2006.01) | |
| *B23K 101/14* | (2006.01) | |
| *C21D 9/08* | (2006.01) | |

(52) U.S. Cl.
CPC ............... *B23K 9/167* (2013.01); *B23K 9/23* (2013.01); *B23K 31/125* (2013.01); *C21D 9/50* (2013.01); *F22B 37/102* (2013.01); *F22B 37/104* (2013.01); *B23K 2201/14* (2013.01); *C21D 9/08* (2013.01)

(58) Field of Classification Search
CPC .... F22B 37/102; F22B 37/104; F22B 37/108; C21D 9/08; C21D 9/50
USPC ... 219/59.1–67, 121.14, 121.17, 137 R, 136; 228/175, 255, 134, 248.1, 225, 226, 231
See application file for complete search history.

(56) References Cited

U.S. PATENT DOCUMENTS

| | | | | |
|---|---|---|---|---|
| 3,745,322 | A | * | 7/1973 | Ito et al. .................... 219/137 R |
| 4,186,864 | A | * | 2/1980 | Ishimaru et al. .......... 219/137 R |
| 4,234,119 | A | * | 11/1980 | Masaoka et al. .............. 228/125 |
| 4,348,131 | A | * | 9/1982 | Shimanuki et al. ........... 403/272 |
| 4,424,436 | A | * | 1/1984 | Humberstone ............ 219/137 R |
| 6,336,583 | B1 | * | 1/2002 | Wang et al. ................... 228/175 |
| 6,919,534 | B2 | * | 7/2005 | Komai et al. .............. 219/137 R |
| 2002/0003135 | A1 | * | 1/2002 | Goto .................. B23K 35/0266 219/145.22 |
| 2004/0089701 | A1 | * | 5/2004 | Tezuka ....................... 228/233.2 |
| 2005/0016980 | A1 | * | 1/2005 | Hara .................... B23K 9/0253 219/137 WM |
| 2010/0006545 | A1 | * | 1/2010 | Macia ...................... B23K 9/04 219/74 |
| 2010/0031506 | A1 | * | 2/2010 | Hartwig et al. .......... 29/890.046 |
| 2010/0300379 | A1 | * | 12/2010 | Itai ........................ F22B 37/102 122/235.12 |
| 2013/0101949 | A1 | | 4/2013 | Mueller et al. |

FOREIGN PATENT DOCUMENTS

| | | |
|---|---|---|
| JP | 3827958 B2 | 9/2006 |
| RU | 1804380 A3 | 3/1993 |
| RU | 2036763 C1 | 6/1995 |
| RU | 2279956 C1 | 7/2006 |
| SU | 697286 A1 | 11/1979 |
| SU | 1167235 A1 | 7/1985 |
| SU | 1646740 A1 | 5/1991 |
| WO | 2008113369 A1 | 9/2008 |

OTHER PUBLICATIONS

Vaillant et al.: "T/P23, 24, 911 and 92: New grades for advanced coal-fired power plants—Properties and experience", International Journal of Pressure Vessels and Piping, Elsevier Science Publishers, Barking, GB, Bd. 85, Nr. 1-2, Jan. 1, 2008, Seiten 38-46, XP022414792, ISSN: 0308-0161, DOI: 10.1016/J.IJPVP.2007.06. 011.

European Search Report: European Application No. 12158733, Dated Nov. 21, 2012, Munchen, Nov. 12, 2012.

The welding technique for type of SA213-T23 steel, Xu Fushan, Ningxia Electric Power, issue 5, pp. 44-46, published on Oct. 31, 2007.

Influence of heat treatment on SA213-T23 weld joint's properties, Mao Yunxian, Electric Welding Machine, vol. 35, issue 8, pp. 12-14 and p. 53, published on Aug. 31, 2005.

Office action issued from Chinese Patent Office dated Jul. 28, 2014 for CN Application No. 20120281010.8.

Decision of Grant issued from Russian Patent Office dated Mar. 17, 2015 for RU Application No. 2012132210.

Liu et al., "SA213-T23 Steel Welding Procedure Test", Welding Technology, vol. 34, No. 5, pp. 37-38, published on Oct. 25, 2005 (Unofficial English Translation Provided).

Lei et al., "Discussion on SA213-T23+SA213-T91 Welding Technology", Shanxi Power, 2001, No. 1, pp. 57-60, published on Feb. 28, 2011 (English Abstract Provided).

Unofficial English Translation of Chinese Office Action and Search Report issued in connection with corresponding CN Application No. 201210281010.8 on Apr. 10, 2015.

* cited by examiner

METHOD FOR WELDING THIN-WALLED TUBES BY MEANS OF PEAK TEMPERATURE TEMPER WELDING

TECHNICAL FIELD

The invention relates to a method for connecting two adjacent parts, in particular two tubes of tube wall registers for the production of a boiler wall. The boiler wall of a steam generator comprises tubes through which flows a medium, said tubes being connected to each other via strips provided on the tubes and forming a closed boiler wall. The tube wall registers can be connected to each other along circular seam register abutments by means of strips on the strip register abutments and/or via the tubes. Joining is accomplished by welding, in particular by means of the tungsten inert gas welding method.

BACKGROUND

During operation, the boiler wall of a steam generator is subjected to great strain. In particular considering the tubes through which flows a medium material, it is necessary that materials be used that can be stressed accordingly. The boiler wall comprises a combustion chamber wall enclosing the combustion chamber of the boiler and an adjoining containing wall of a flue gas pass. The combustion chamber wall, as well as the containing wall, must be able to remove sufficient heat. In order to meet these requirements, the material that could be used for the walls is a martensitic steel alloy. However, these materials require the subsequent heat treatment, which is why it is desirable that a material be used that avoids the subsequent heat treatment. Therefore, ferritic, bainitic or bainitic-martensitic steel alloys are preferably used. Due to their chemical composition, a few of these alloys—even when welding takes place with pre-heating—tend to increased hardening when cooling from the welding temperature. Hereinafter, such alloys will be referred to as being "air-hardening". In particular, the material T23 (7Cr-WVMoNb 9-6) or T24 (7CrMoVTiB 10-10) are used, these being defined and/or standardized by European Standard EN 10216, as well as by ASTM A213/A213M-09a, American Society for Testing and Materials (ASTM International; West Conshohocken, Pa. USA). Material T24 is referred to as standard 7CrMoVTiB 10-10. Based on the technical delivery conditions for seamless steel tubes for operating under pressure (DIN EN 10216-2) the carbon content of the components to be joined can be 0.05 wt %-0.10 wt % (wt %=percent by weight).

It has been found that tubes of such materials, in particular materials T24 and T23, are subject to damage during operation of the steam generator. The material hardens fully during the welding operation so that cracks form on the inside of the tube due to geometric irregularities in the root, due to the high pressure and due to the high temperatures, said cracks then leading to damage and ultimately to leaks in the tube.

Herein, tubes having a wall thickness of up to 5 mm to a maximum of 10 mm are referred to as thin-walled tubes. The VD TÜV (German Technical Control Association) material data sheet 533/2 does not provide for a subsequent heat treatment in TIG (tungsten inert gas) welded thin-walled tubes having a wall thickness of ≤10 mm. Hardness increases in welding could indeed be eliminated by a subsequent heat treatment at a tempering temperature; however, it has been found that this is not only expensive but may also lead to the formation of cracks and to a distortion of the heat-treated components. In large boilers, this method is not feasible.

Until now, another solution that has been considered is welding above the martensite start temperature. However, this temperature is very high and thus this suggestion has also been unsuitable in practical applications. This method results in a super-heated structure and is accompanied by a deterioration of the material properties.

Consequently, it is the object of the present invention to provide a welding method for welding tube wall registers that is also suitable for air-hardening steel alloys and, in particular, for materials T23 and T24 and, in particular, for thin-walled tubes.

SUMMARY

A method is disclosed for connecting two components by welding, wherein at least one of the two components or a weld filler material used in the production of the weld joint consists of an air-hardening steel alloy, the method including: providing of a joint extending from an inside toward an outside between the two components that are to be connected; welding of a root layer in the region of the inside; welding of a fill layer adjoining the root layer; and welding of at least one cover layer adjoining the fill layer in a region of the outside with prespecified welding parameters, so that a temperature in an optimizing temperature range is adjusted in the region of the root layer on the inside, the at least one cover layer comprising bead tracks next to each other in at least one of the at least one cover layers, and a cover layer above the bead tracks next to one another, which is applied in a one bead track.

In joint welding of two components, for example of two tubes or two strips, a multi-layer weld seam is formed in a joint. First, a root layer is produced. The root layer is located on an inside that is formed when two tubes are being welded together, said inside being formed by the tube associated with the medium. Preferably, the joint widens from the inside toward an opposing outside. The joint may be a V-joint having a triangular or trapezoidal cross-section.

Subsequently, at least one fill layer is applied to the root layer, said fill layer filling the joint between the two components to be connected up to essentially the height of the outside, if possible. Joint welding of equal types of pipes is accomplished with the use of a weld filler material that is of the same type as the material of the components that are to be joined. Consequently, for example, two tubes of T24 are welded together with the corresponding weld filler material WZCrMo2VTiNb. In addition, the welding method can be used for foreign types of weld joints, where at least one of the components to be joined and/or the weld deposit exhibit air-hardening properties. The so-called tungsten inert gas welding (TIG welding) method is used as the welding method.

The welding conditions for the root layer and the fill layer can be determined as is appropriate. In doing so, hardened zones are formed in the region of the root layer, in which case α-mixed crystals have transformed into γ-mixed crystals in said hardened zones. The γ-mixed crystals display a greater carbon solubility, which—during the cooling process—results in a strained lattice and concomitant increased hardening of the material in the thermally influenced zone as well as in the weld deposit itself. This hardness increase also occurs in the region of the inside of the components that are to be joined, which is particularly critical. This extreme hardness makes the components, for example, the tube wall registers, sensitive to the formation of cracks, optionally also stress cracking corrosion, at the joining site, in particular the inside surface. Another critical, occurring hardening mechanism is the separation of special carbides in a temperature range of 550° C. Such special carbides lead to a sensitization of the thermally influenced region and to an increased susceptibility to the so-called damage mechanism of relaxation crack formation.

Consequently, in accordance with the invention, one or more cover layers are welded onto the fill layer, whereby the welding parameters are prespecified in such a manner that heating of the weld seam in the region of the inside and/or the root layer—said heating being caused by the welding process—occurs within an optimizing temperature range and thus results in reduced hardness. The optimizing temperature range for optimizing the hardness, as well as for optimizing the microstructure, is determined by the material-specific holding or transformation points of the $A_{C1}$-temperature and the $A_{C3}$-temperature of the phase diagram and, in particular, also the material-specific separating temperatures of the special carbides. Preferably, this condition is achieved in that the welding current intensity is limited to a range between 70 and 120 Amps.

Preferably, the at least one cover layer is applied by so-called pendulum welding. In doing so, the weld bead of the cover layer is not produces as a linear bead but as a pendulum bead. It extends in the form of a serpentine line in the joint. When the pendulum bead is produced, the welding electrode and/or the welding wire of the weld filler material is moved not only along the weld seam but, at the same time, back and forth transversely thereto, so that a serpentine bead shape is created. Due to this motion, the distance from the previously hardened zones on the inside or in the region of the root layer changes constantly. The heat supply to these hardened zones is moderate, so that the temperature can be kept in the optimizing temperature range. In doing so, the welding current is thus limited to a maximum value in the range between 70 and 120 Amps.

BRIEF DESCRIPTION OF THE DRAWINGS

Preferably, the welding current for welding the root layer and/or the fill layer is greater than that for welding the at least one cover layer. The welding current for welding the root layer may then be lower than that used for welding the fill layer.

Advantageous embodiments of the method in accordance with the invention can be inferred from the dependent patent claims as well as from the description. The description explains one exemplary embodiment of the method and is restricted to the essential features of the invention as well as to other circumstances. The drawings are to be used for supplementary information. They show in FIG. 1 a perspective view of a schematic illustration of a tube, as in the example, as a component of the tube wall register;

DETAILED DESCRIPTION

Figure 1:
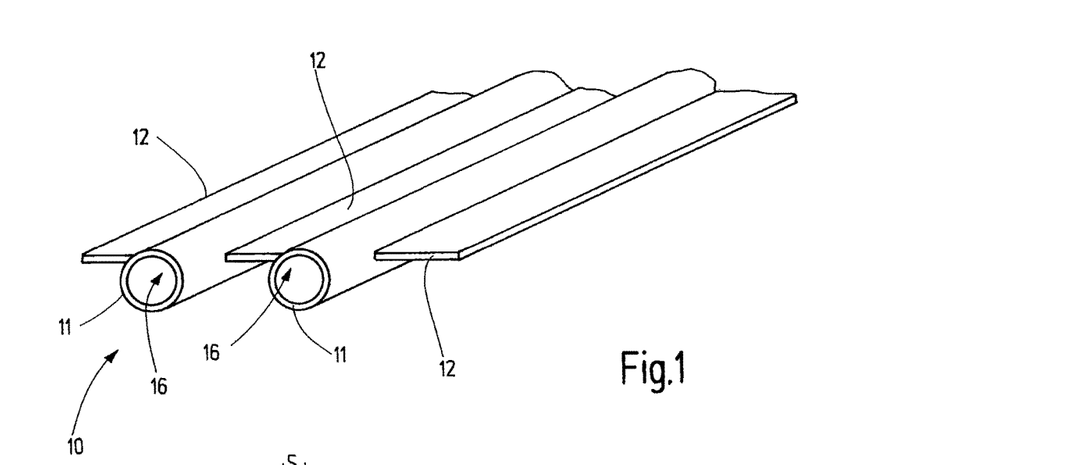

FIG. 1 shows a tube 11 as an exemplary component of a tube wall register 10 that is used for the manufacture of a boiler wall. The boiler wall comprises a combustion chamber wall enclosing a combustion chamber of the boiler and a containing wall enclosing the flue gas pass adjoining the combustion chamber. The boiler wall is configured so as to be gas-tight.

Figure 2:
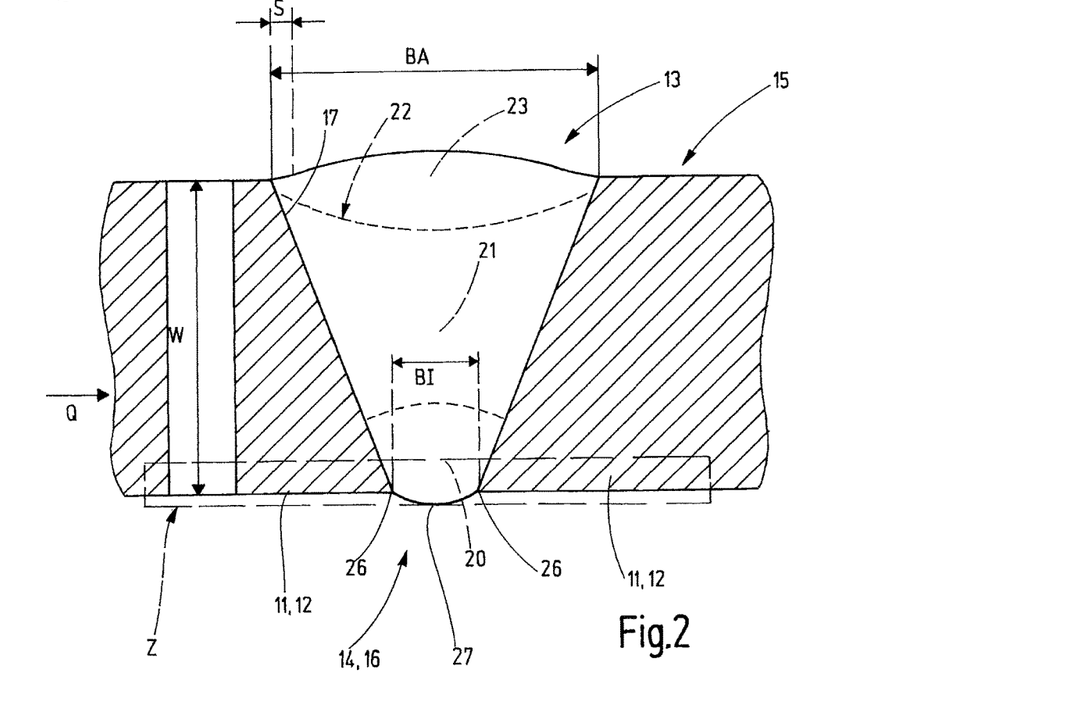
FIG. 2 a schematic cross-sectional illustration of a joint comprising a multi-layer weld seam at a joining site of two components, for example two tubes.

Frequently, it is necessary that the tubes 11 be connected to each other in a fluid-tight manner by welding, e.g., TIG welding on the two affected tube ends, e.g., when a boiler wall is being manufactured. In doing so, the tubes 11 of adjacent boiler wall registers 10 are connected to each other. This connection is accomplished by welding, for example by TIG welding. The tubes 11 of two adjacent tube wall registers 10 are connected to each other at circular seam register abutments, and/or strips 12 of two adjacent tube wall registers 10 at register abutments, by means of a weld seam 13. FIG. 2 shows a schematic representation of such a weld seam 13. The joint 17 for the weld connection between the two components 11, 12 that are to be connected has a triangular or trapezoidal cross-section and widens from an inside 14 toward an outside 15. When two tubes are being connected, the inside 14 is represented by the tube interior wall 16 facing a process medium. The width BA of the joint 17 on the outside 15 is approximately 10 to 12 millimeters. The width BI of the joint 17 on the inside 14 is approximately 2 to 4 millimeters.

The wall thickness W of the two components 11, 12 that are to be connected is between 5 and 10 millimeters. The tubes 11 and/or the strips 12 consist of an air-hardening steel alloy, in particular of a bainitic or bainitic-martensitic steel alloy. In the exemplary embodiment, the material used is T24 (7CrMoVTiB 10-10) having a carbon content of at least 0.05 wt % and, for example, 0.1 wt %.

The weld seam 13 is made up of several layers. It comprises a root layer 20 on the inside 14 of the components 11, 12 that are to be joined. At least one fill layer 21 is applied to this root layer 20, said fill layer essentially completely filling the joint 17 together with the root layer 20. The number of fill layers depends on the wall thickness. In accordance with the example, the fill layer 21 adjoins the outside 15 and has a surface 22 facing away from the root layer 20 in joint transverse direction Q in a concavely curved manner. The joint 17 is at least 90% filled by the fill layer 21 and the root layer 20.

Figure 5:
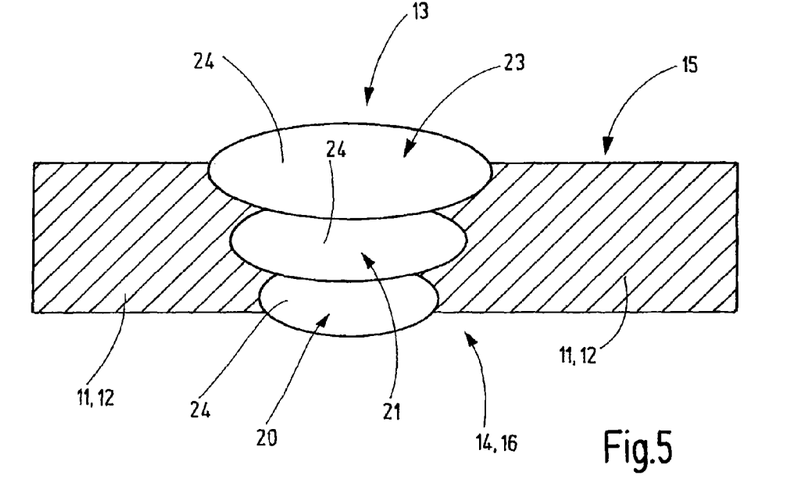
FIGS. 5 through 8 schematic cross-sectional illustrations that show the arrangement options for several layers of the weld bead.
Figure 6:
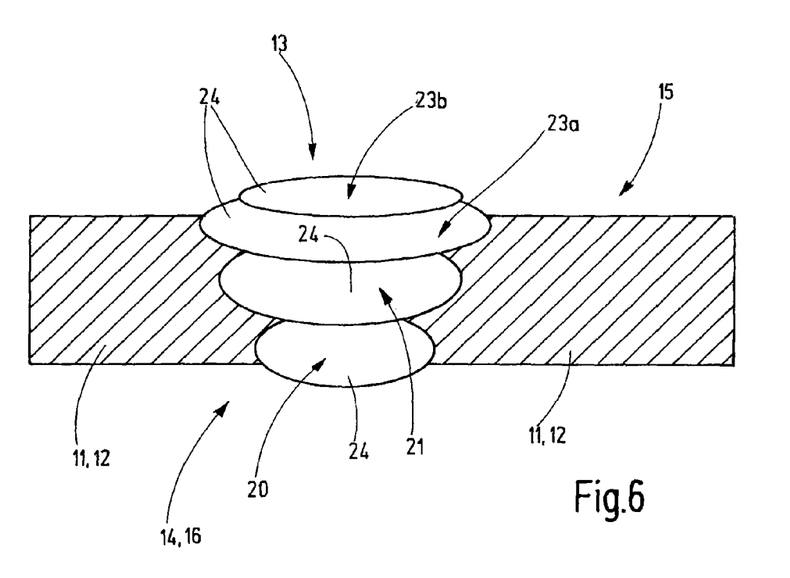
Figure 7:
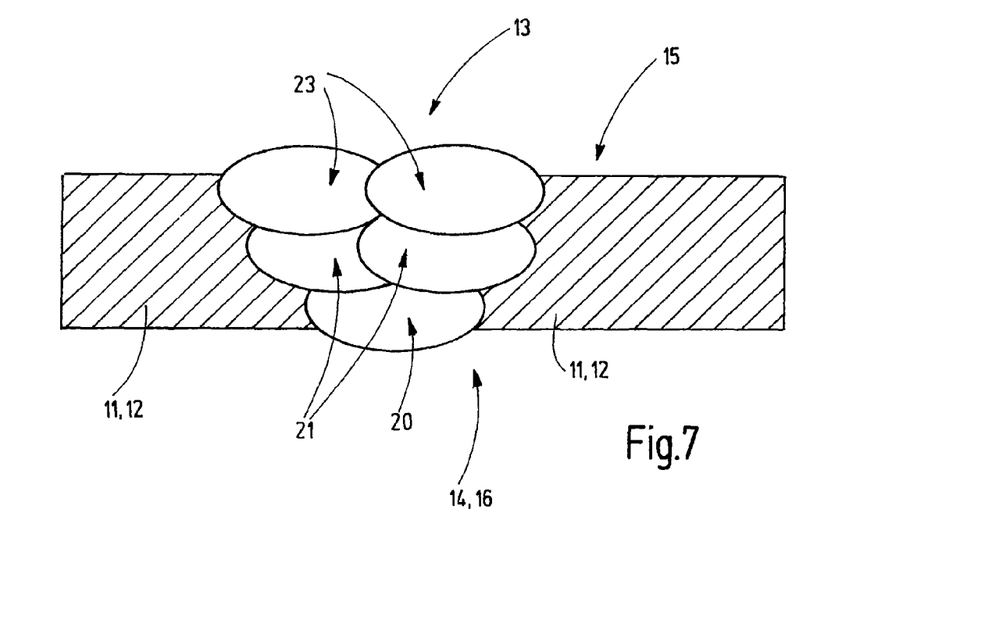
Figure 8:
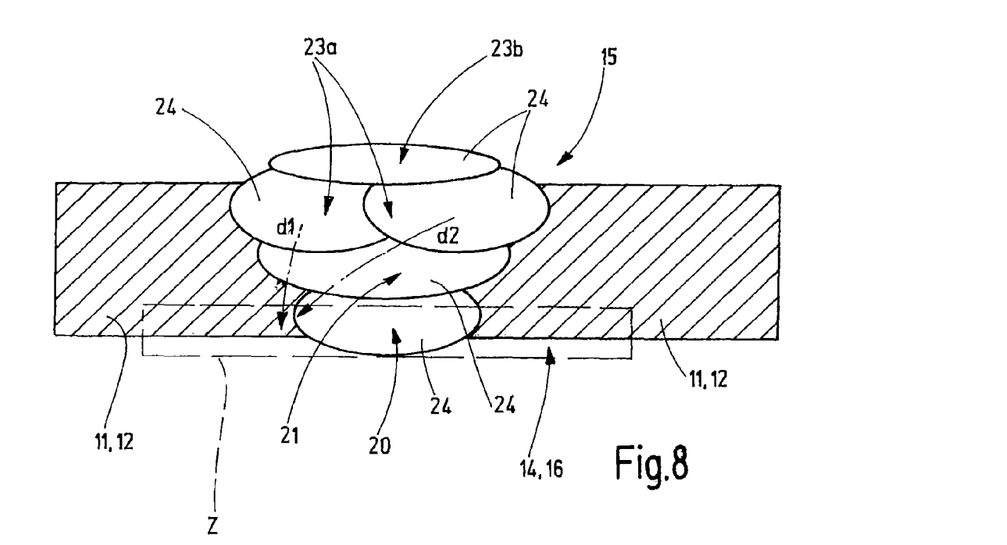

At least one cover layer 23 and, preferably, a first cover layer 23a and a second cover layer 23b, are applied to the fill layer 21. The number of weld bead tracks per layer 20, 21, 23 may vary. For example, FIGS. 5 and 6 show the layers 20, 21, 23 with respectively one bead track 24, whereas FIGS. 7 and 8 show the single cover layer 23 of two adjacent bead tracks 24 formed in joint transverse direction Q. Also, the first cover layer 23a in FIG. 8 comprises two bead tracks 24 that are adjacent to each other in joint transverse direction Q. Likewise, the other layers 20, 21 may comprise several bead tracks 24. The number of bead tracks 24 of a layer 20, 21 23 may also be greater than two.

In the embodiment of the weld joint as in FIG. 7 or 8, the two bead tracks 24 are next to each other in one cover layer 23 or 23a. The distance of each bead track 24 from a point in the thermally influenced zone Z outside the center plane through the joint 17 varies as is schematically shown by the example of a random location in FIG. 8 by the arrows d1 and d2. Therefore, the extent of thermal influence at this location also varies while the two bead tracks 24 of the cover layer 23 or 23a are being welded. An asymmetry is the result. Depending on which bead track 24 is being welded last, this can result in a potentially undesirably great hardness on the affected side of the joint 17 in the thermally influenced zone Z. In those cases, as shown by FIG. 8, a second cover layer 23b is applied in one bead track, so that the asymmetrical temperature influences in the thermally influenced zone Z are again offset.

In particular in the region along the inside 14, the weld joint must not exhibit any increased hardness due to martensite formation and secondary hardening that promotes the formation of cracks. In particular in this region, the hardness must be lower than 350 HV. Particularly critical are the two transitions 26 between the root layer 20 and the respectively adjacent component 11, 12, as well as the root sag 27. In particular at these critical points 26, 27, it is possible for a crack formation to begin when the inside region exhibits increased hardness.

Welding of the at least one cover layer 23 is accomplished with prespecified welding parameters such that, on the inside 14 in the region of the root layer 20, a temperature T in an optimizing temperature range of approximately 600° C. to approximately 1000° C. is adjusted in a thermally influenced zone Z. In accordance with the example, the optimizing temperature range is between the material-specific $A_{C1}$-temperature and the $A_{C3}$-temperature. The lower limit of the optimizing temperature range may also be approximately 100° C. below the $A_{C1}$-temperature due to separation processes. For example, for material T24, the $A_{C1}$-temperature is 815° C. and the $A_{C3}$-temperature is 930° C. Consequently, when the root layer 20 is produced and/or when the fill layer 21 is produced, increased hardening in the thermally influenced region on the inside 14 is reduced or eliminated, and the hardness in this thermally influenced region is reduced to admissible values on the inside 14, said values being lower than 350 HV, in particular.

In accordance with the example, the welding current I is used as the prespecified welding parameter, said parameter being prespecified when the at least one cover layer 23 is being welded.

Figure 9:
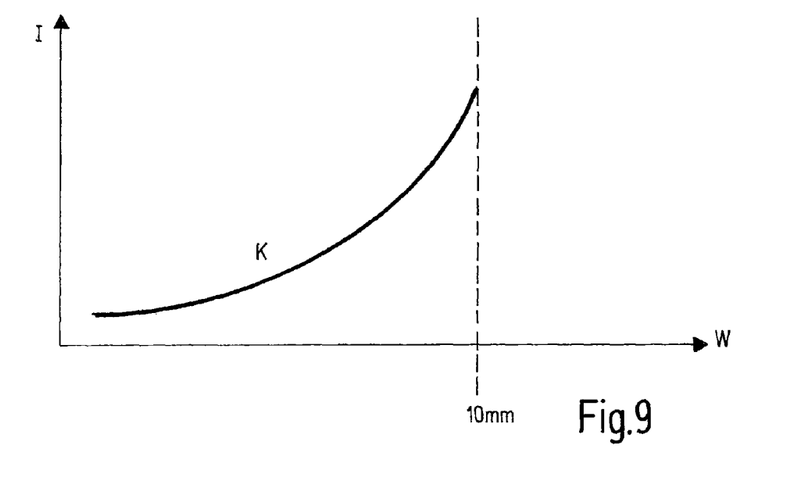
FIG. 9 a representation of the relationship between the current intensity of the weld bead I and the wall thickness W.

The welding current I for welding the at least one cover layer 23 is adjusted consistent with a prespecified non-linear relationship with the wall thickness W, as is shown in qualitative terms by curve K in FIG. 9. The welding current I and the welding current changes increase with increasing wall thicknesses W. This means that the pitch of the curve K increases as the wall thickness W increases.

Figure 10:
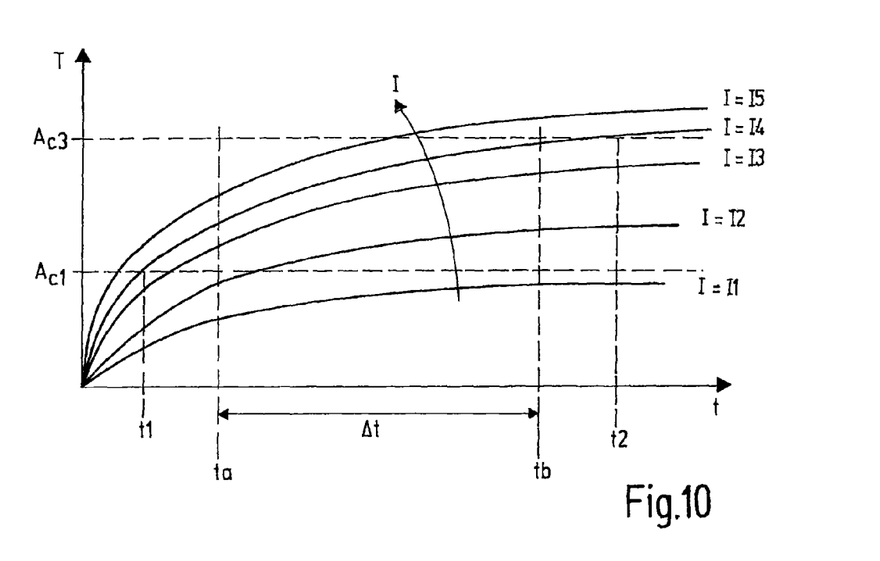
FIG. 10 the relationship between the temperature I in a thermally influenced zone Z as a function of time t for various current intensities of the welding current I and for a wall thickness W.

When the cover layer 23 is being welded, the welding current I is adjusted in such a manner that the temperature input and the heat dissipation through the walls of the tubes 11 to be connected in the region of the inside 14 are in a state of equilibrium within the optimizing temperature range between $T=A_{C1}$ and $T=A_{C3}$. The resultant relationships for each wall thickness W are shown in FIG. 10. The temperature T in the thermally influenced zone Z in the region of the inside 14 is shown there for a wall thickness W as a function of time t at a peripheral point along the joint 17. A different relationship results for each welding current I, so that, using the welding current I as a parameter, a family of curves is obtained.

In order to achieve the above-described state of equilibrium, the current intensity of the welding current I is defined such that the temperature T in the thermally influenced zone Z exceeds the $A_{C1}$-temperature at a first time t1, this value being lower than the prespecified first time duration limit ta. The $A_{C1}$-temperature represents the lower temperature limit that must be achieved. Also, the welding current I is adjusted such that the temperature T in the thermally influenced zone Z does not exceed the upper temperature limit prespecified by the $A_{C3}$-temperature before a second time duration limit tb has elapsed. The time difference $\Delta t$ between the second time duration limit tb and the first time duration limit ta is sufficiently great that sufficient time remains for welding by an operator. Inasmuch as the operator moves the electrode along the joint 17, the prespecified time interval $\Delta t$ prespecifies a sufficiently large time period for any operator of a welding device, so that—regardless of the individual habits of the operator—a temperature input into the thermally influenced zone Z is achieved within the desired optimizing temperature range between the $A_{C1}$-temperature and the $A_{C3}$-temperature.

Referring to the example shown by FIG. 10, the current intensity I4 for the welding current I is suitable, for example. The associate temperature curve reaches the $A_{C1}$-temperature at a first time t1, said temperature being lower than the first time duration limit ta, and only exceeds the $A_{C3}$-temperature at a second time t2 after the second time duration limit tb has elapsed. The current intensity of I3 would also be suitable for the welding current I.

If several cover layers 23a, 23b are produced, the welding parameters, and in particular, the welding current I, are identical for all cover layers 23a, 23b under the same geometric conditions of the components that are to be connected.

On one or on both sides, the cover layer 23 may be at a distance from the respectively adjacent component 11, 12, said distance being referred to as the seam width S and being, in accordance with the example, between 0 and 2 millimeters.

Figure 3:
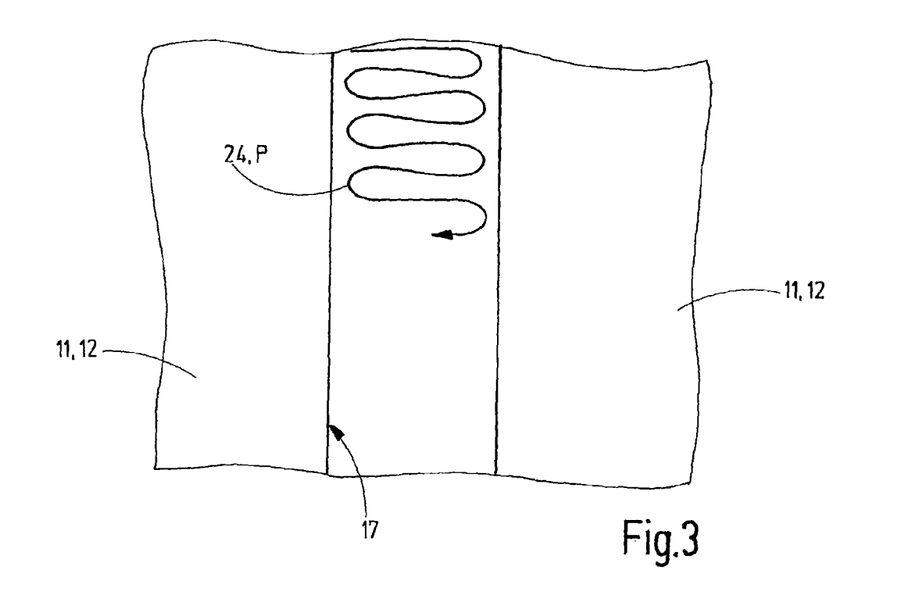
FIGS. 3 and 4 a schematic illustration of the progression of one of more pendulum beads of a cover layer of the weld seam.
Figure 4:
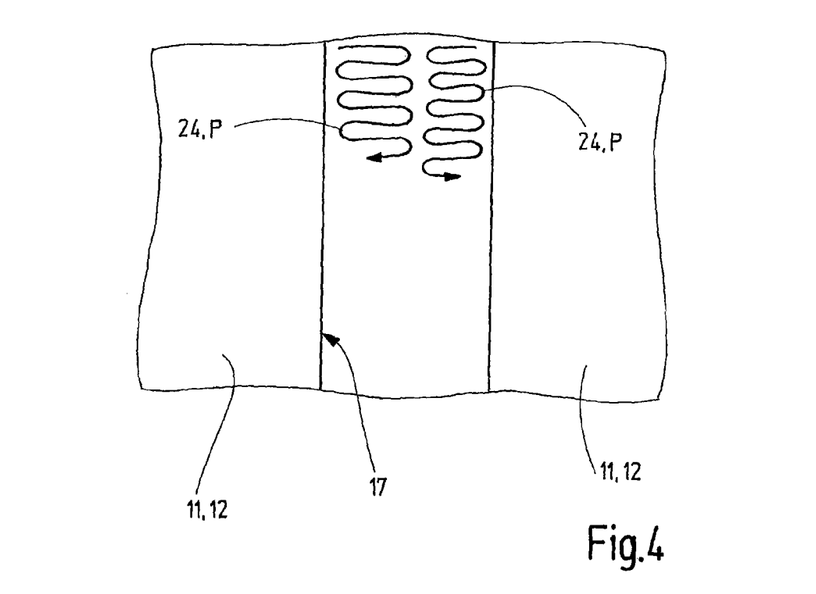

The weld bead 24 of the cover layer 23 or the weld beads 24 of the cover layers 23a, 23b are not applied as linear beads but in the form of pendulum beads P, as is schematically shown by FIGS. 3 and 4. During the welding operation, the welding electrode and/or the welding wire of weld filler material are moved in serpentine lines or zigzag lines in the joint 17. In doing so, the deflection in joint transverse direction Q is at least twice or three times the electrode diameter or the welding wire diameter. As a rule, if the components to be connected consist of the same type of material, the same type of weld filler material is used, for example WZCrMo2VTiNb, for tubes of T24. If the weld joints are of a foreign type of material, the welding technique in accordance with the invention can be used, provided at least one of the components to be connected and/or the weld filler material exhibit air-hardening properties. In accordance with the example, the welding wire has a diameter of 2.0 to 3.5 millimeters.

The invention relates to a method for connecting two components 11, 12 by TIG welding, said components consisting of a steel alloy exhibiting air-hardening properties and, in particular, of the material T23 or T24. A joint 17 is produced between the components that are to be connected, said joint widening, in particular, from an inside 14 toward an outside 15. First, a root layer 20 is welded in the region of the inside 14. Subsequently, a fill layer 21 adjoining the root layer 20 is welded, so that the joint is at least 90% filled. Finally, a cover layer 23 is welded onto the fill layer 21, whereby the welding parameters are prespecified in such a manner that a temperature in an optimizing temperature range is adjusted on the inside 14 in the region of the root layer 20.

What is claimed is:

1. A method for connecting two components by welding, wherein at least one of the two components or a weld filler material used in the production of the weld joint consists of an air-hardening steel alloy, said method comprising:
   providing a joint extending from an inside toward an outside between the two components that are to be connected;
   welding a root layer in the region of the inside;
   welding of a fill layer adjoining the root layer;
   welding a first cover layer comprising adjacent bead tracks and adjoining the fill layer in a region of the outside;
   welding a second cover layer comprising a single bead track above the first cover layer; and
   wherein a welding current for welding the first cover layer and the second cover layer is adjusted in a non-linear manner with respect to a wall thickness of the two components so that a temperature in the region of the root layer on the inside is adjusted within an optimizing temperature range of approximately 600° C. to approximately 1000° C.

2. The method of claim 1, wherein the steel alloy has a chromium content in the range of 1.9-2.6 percent by weight (wt %).

3. The method of claim 2, wherein the steel alloy has a chromium content in the range of 2.25-2.5 percent by weight (wt %).

4. The method of claim 1, wherein at least one weld bead of the first and the second cover layers is applied as a pendulum bead.

5. The method of claim 1, wherein an upper limit of the optimizing temperature range corresponds to a material-specific $A_{C3}$-temperature of the components that are to be connected.

6. The method of claim 1, wherein a lower limit of the optimizing temperature range is approximately at 600° C. or at 700° C.

7. The method of claim 1, wherein a lower limit of the optimizing temperature range corresponds to a material-specific $A_{C1}$-temperature of the components that are to be connected.

8. The method of claim 1, wherein the welding current for welding the first and the second cover layers is between 70 and 120 Amps.

9. The method of claim 1, wherein the components that are to be connected are two tubes or two strips of a tube wall register of a boiler wall.

10. The method of claim 1, wherein the wall thickness of the components that are to be connected is smaller than 10 millimeters.

11. The method of claim 1, wherein the wall thickness of the components that are to be connected is in the range of 5.6 to 6.3 millimeters.

12. The method of claim 1, wherein the carbon content of the components that are to be connected is at least 0.05 to 0.10 percent by weight (wt %).

13. The method of claim 1, wherein each of the layers comprises one or more weld seam tracks.

14. The method of claim 1, where in the welding wire has a diameter of 2.0 to 2.5 millimeters.

15. The method of claim 1, wherein the welding current for welding the first and the second cover layers is between 85 to 95 Amps.

16. A method for welding two components together comprising:
   providing a joint extending from an inside toward an outside between the two components;
   welding a root layer in the region of the inside;
   welding a fill layer adjoining the root layer;
   welding a first cover layer comprising adjacent bead tracks and adjoining the fill layer in a region of the outside;
   welding a second cover layer comprising a single bead track above the first cover layer in a region of the outside; and
   wherein a welding current for welding the first cover layer and the second cover layer is adjusted in a non-linear manner with respect to a wall thickness of the two components so that a temperature in the region of the root layer on the inside is adjusted within an optimizing temperature range of approximately 600° C. to approximately 1000° C.,
   at least one of the two components, or a weld filler material used to produce the joint, comprises an air-hardening steel alloy, and
   at least one of the root layer and the fill layer includes a single bead track.

* * * * *